US007703032B2

(12) United States Patent
Wells

(10) Patent No.: US 7,703,032 B2
(45) Date of Patent: Apr. 20, 2010

(54) BINDING A GUI ELEMENT TO LIVE MEASUREMENT DATA

(75) Inventor: Elton Wells, Austin, TX (US)

(73) Assignee: National Instruments Corporation, Austin, TX (US)

( * ) Notice: Subject to any disclaimer, the term of this patent is extended or adjusted under 35 U.S.C. 154(b) by 865 days.

(21) Appl. No.: 11/079,363

(22) Filed: Mar. 14, 2005

(65) Prior Publication Data

US 2005/0228608 A1 Oct. 13, 2005

Related U.S. Application Data

(60) Provisional application No. 60/561,473, filed on Apr. 12, 2004.

(51) Int. Cl.
*G06F 3/048* (2006.01)
(52) U.S. Cl. .................. 715/771; 715/763; 702/121; 703/14
(58) Field of Classification Search ............... 715/762, 715/763, 771; 702/68, 121; 703/13–28
See application file for complete search history.

(56) References Cited

U.S. PATENT DOCUMENTS

| | | | | |
|---|---|---|---|---|
| 6,370,569 | B1 * | 4/2002 | Austin | .................. 709/217 |
| 6,643,691 | B2 | 11/2003 | Austin | |
| 6,751,653 | B2 | 6/2004 | Austin | |
| 6,763,395 | B1 | 7/2004 | Austin | |
| 2002/0070965 | A1 * | 6/2002 | Austin | .................. 345/762 |
| 2002/0070966 | A1 | 6/2002 | Austin | |
| 2002/0070968 | A1 | 6/2002 | Austin | |
| 2003/0076355 | A1 * | 4/2003 | Kodosky | .................. 345/763 |
| 2003/0184596 | A1 * | 10/2003 | Kodosky et al. | ............ 345/810 |

* cited by examiner

*Primary Examiner*—Ba Huynh
(74) *Attorney, Agent, or Firm*—Meyertons Hood Kivlin Kowert & Goetzel, P.C.; Jeffrey C. Hood

(57) ABSTRACT

A system and method for binding a GUI element to a data source of live measurement data are described. A data source component may be included in a program and may be configured with a binding to a data source of live measurement data in response to user input. A GUI element may also be included in the program, and the binding configured for the data source component may be associated with the GUI element in response to user input. Associating the binding with the GUI element may effectively bind the GUI element to the data source of live measurement data and may enable the GUI element to automatically display the live measurement data from the data source during execution of the program. A system and method for binding a GUI element in a program to a data target for live measurement data are also described. A GUI element may be included in a program, and the GUI element may be configured to display live measurement data during execution of the program. A data target component may also be included in the program and may be configured with a binding to a data target in response to user input. The binding configured for the data target component may then be associated with the GUI element in response to user input. Associating the binding with the GUI element may enable the program to automatically send the live measurement data displayed by the GUI element to the data target during execution of the program.

27 Claims, 16 Drawing Sheets

BINDING A GUI ELEMENT TO LIVE MEASUREMENT DATA

PRIORITY CLAIM

This application claims benefit of priority of U.S. Provisional Application Ser. No. 60/561,473 titled "Binding a GUI Element to Live Measurement Data", filed Apr. 12, 2004, whose inventor was Elton Wells.

FIELD OF THE INVENTION

The present invention relates to the field of computerized measurement applications, and more particularly to a system and method for binding a GUI element in a software program to a data source of live measurement data or a data target for live measurement data.

DESCRIPTION OF THE RELATED ART

Scientists and engineers often use test, measurement, or automation systems to perform a variety of functions, including measurement of a physical phenomenon or unit under test (UUT), test and analysis of physical phenomena, simulation, hardware-in-the-loop testing, process monitoring and control, control of mechanical or electrical machinery, data logging, and laboratory research, to name a few examples. The test, measurement or automation systems that perform such functions may be collectively referred to as "measurement systems".

Measurement systems are moving toward computer-based systems where a computer system performs much of the processing, analysis, or control for the application. Measurement systems are also moving toward network-based or distributed systems, where a plurality of network-based devices operate together to perform a desired function.

In a measurement application, it is often useful to display live measurement data. In many instances, the live measurement data may be generated by an instrument or device other than the computer system on which the live measurement data needs to be displayed. In this case, displaying the live measurement data may involve programming the computer to connect to a data source of the live measurement data, receive the live measurement data from the data source, and display the live measurement data.

However, scientists and engineers are often not highly trained in the art of computer programming, and in particular, may not be trained to perform the networking tasks described above. Thus, it may be desirable to provide a system and method for simplifying or automating the task of displaying live measurement data from a remote data source.

DataSocket is a technology that simplifies exchange of data between computers. DataSocket provides a common API to a number of different communication protocols. In particular, DataSocket defines a network communication protocol useful for exchanging live measurement data over a network and simplifies the exchange of live measurement data for a network application. DataSocket uses an enhanced data format for exchanging measurement data, as well as the attributes of the data. Data attributes might include information such as an acquisition rate, test operator name, time stamp, and quality of data.

A DataSocket server executes to enable data exchange between computers that produce live measurement data and computers that receive the live measurement data. For example, the computers may be connected though a TCP network, such as the Internet. DataSocket data sources and data targets can be specified using uniform resource locators (URLs) that adhere to the familiar URL model.

SUMMARY OF THE INVENTION

One embodiment of the present invention comprises a system and method for binding a GUI element to a data source of live measurement data. According to one embodiment of the method, a component referred to as a data source component may be included in a program in response to user input. In one embodiment the data source component may comprise a software component, object, or control having associated program instructions. For example, the data source component may have functionality implemented by the associated program instructions for connecting to a data source, e.g., to receive live measurement data from the data source.

The data source component may be configured with a binding to a data source of live measurement data in response to user input. In various embodiments, the data source may comprise any kind of source operable to send live measurement data to the data source component. For example, in one embodiment the data source may be associated with a remote computer that acquires the live measurement data from a device or instrument. In another embodiment the data source may be associated with a server computer, where the server computer receives the live measurement data from another computer and relays the live measurement data to the computer on which the program including the data source component executes. For example, in one embodiment the data source component may be configured with a binding to a data source of live measurement data associated with a DataSocket server computer.

In various embodiments, different kinds of information may specify or identify the data source of live measurement data. For example, in one embodiment the user may specify a network address identifying the data source of live measurement data. In one embodiment, the data source of live measurement data may be referenced by a uniform resource locator (URL). As one example, where the data source is associated with a DataSocket server, the URL may reference the data source on the DataSocket server computer.

A GUI element may also be included in the program in response to user input. The GUI element may comprise any kind of user interface element or indicator operable to display live measurement data.

The binding configured for the data source component may be associated with the GUI element in response to user input. Associating the binding with the GUI element may effectively bind the GUI element to the data source of live measurement data and may enable the GUI element to automatically display the live measurement data from the data source during execution of the program.

The method described above may advantageously remove the burden on the user (programmer) from implementing functionality for obtaining live measurement data from a remote data source and displaying the live measurement data in a program. In one embodiment the user may be required to write little or no source code to implement this functionality and may instead simply interact with a graphical user interface of an application development environment (ADE) used to create the program, e.g., may interact with the graphical user interface of the ADE to configure the data source component with the binding to the data source of live measurement data and to associate the binding with the GUI element.

Another embodiment of the invention comprises a system and method for binding a GUI element in a program to a data target for live measurement data. According to one embodiment of the method, a GUI element may be included in a program in response to user input, similarly as described above. The GUI element may be configured to receive live measurement data during execution of the program. For example, the computer on which the program executes may be coupled to a device or instrument operable to acquire the live measurement data. The GUI element may be configured to receive the live measurement data from the device or instrument. For example, in one embodiment the GUI element may comprise an indicator configured to display the live measurement data.

A component referred to as a data target component may also be included in the program in response to user input. The data target component may comprise a software component, object, or control similar to the data source component described above. However, rather than being operable to receive live measurement data from a data source, the data target component may be operable to send live measurement data to a data target. For example, the data target component may have associated program instructions that implement functionality to connect to a data target, e.g., via a network, and send live measurement data to the data target.

The data target component may be configured with a binding to a data target in response to user input, similarly as described above. However, instead of specifying a data source from which to receive live measurement data, the user may specify a data target to which to send live measurement data.

The binding configured for the data target component may then be associated with the GUI element in response to user input. Associating the binding with the GUI element may enable the program to automatically send the live measurement data displayed by the GUI element to the data target during execution of the program.

This method may advantageously remove the burden on the user (programmer) from implementing functionality for sending live measurement data that is displayed in a GUI element to a remote data target. In one embodiment the user may be required to write little or no source code to implement this functionality and may instead simply interact with a graphical user interface of the application development environment used to create the program, e.g., may interact with the graphical user interface of the ADE to configure the data target component with a binding to a data target for the live measurement data and to associate the binding with a GUI element. In one embodiment, the user may already have a program that includes a GUI element operable to receive and display live measurement data. Thus, the user may be able to easily configure the live measurement data to also be sent to a remote data target.

BRIEF DESCRIPTION OF THE DRAWINGS

A better understanding of the present invention can be obtained when the following detailed description of the preferred embodiment is considered in conjunction with the following drawings, in which.

Figure 1:
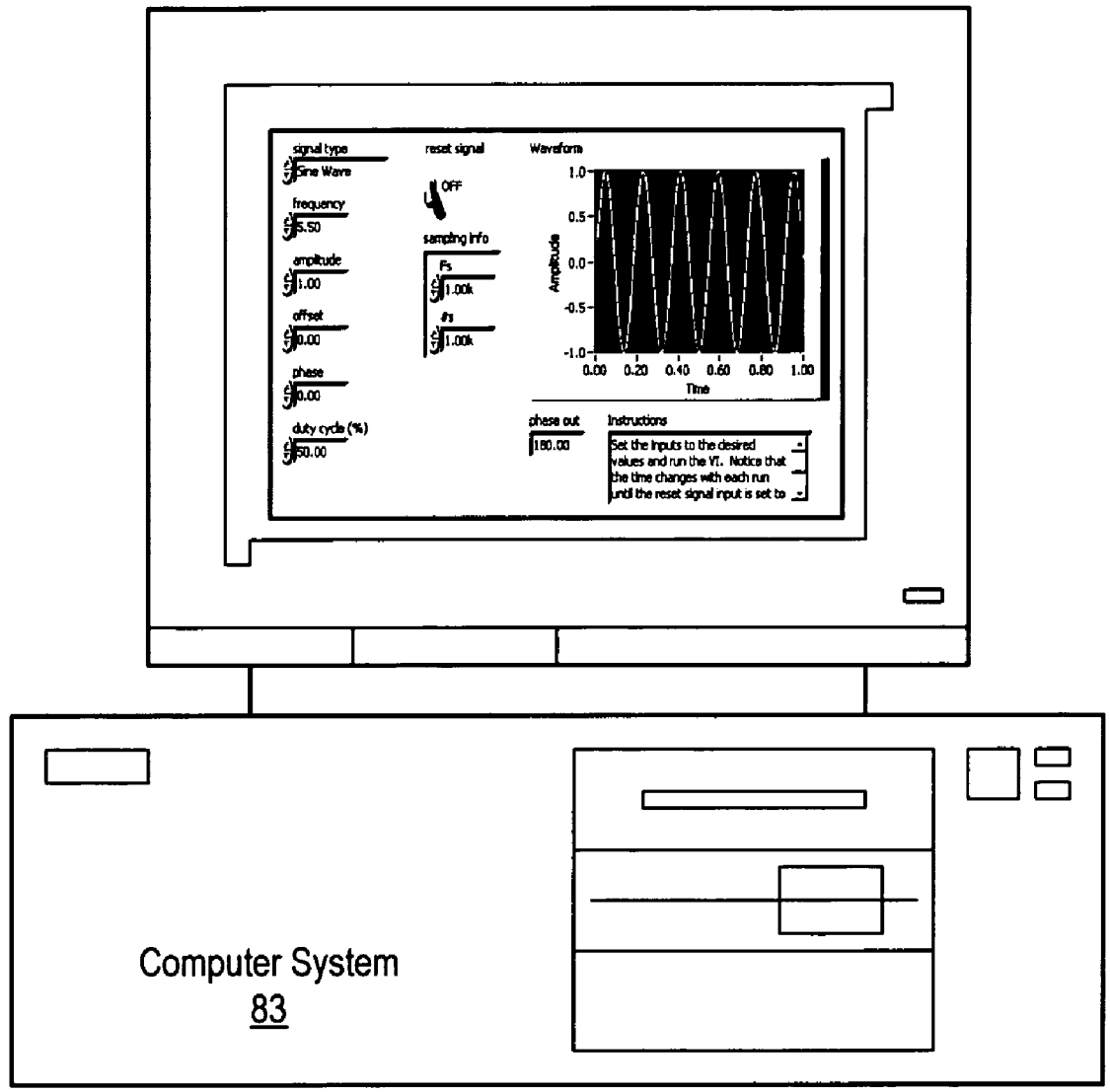
FIG. 1 illustrates a computer system operable to create and/or execute a program that includes a GUI element bound to live measurement data.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical programming development environments that may be used to create graphical programs include LabVIEW, DASYLAB, DIADEM and MATRIXX/SYSTEMBUILD from NATIONAL INSTRUMENTS, SIMULINK from the MATH WORKS, VEE from AGILENT, WIT from CORECO, VISION PROGRAM MANAGER from PPT VISION, SOFTWIRE from MEASUREMENT COMPUTING, SANSRIPT from NORTHWOODS SOFTWARE, KHOROS from KHORAL RESEARCH, SNAP MASTER from HEM DATA, VISSIM from VISUAL SOLUTIONS, OBJECT BENCH by SES (SCIENTIFIC AND ENGINEERING SOFTWARE), and VISIDAO from ADVANTECH, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI elements, or may comprise a plurality of individual GUI elements (or individual windows each having one or more GUI elements), wherein the individual GUI elements or windows may optionally be tiled together.

Graphical User Interface Element (GUI element)—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Measurement Data—data generated by a measurement device. For example, the measurement device may receive a signal from a unit under test or a physical system and may generate measurement data based on the signal. The measurement device may be coupled to another device, e.g., a computer system, that receives the measurement data generated by the measurement device.

Live measurement data—measurement data that is generated continuously or quasi-continuously by a measurement device. For example, live measurement data may comprise a stream of data elements (e.g., floating point numbers or other elements) generated in rapid succession by the measurement device. Examples of live measurement data include data that is generated in real time based on a physical signal, e.g., where data values are generated in a live or streaming manner.

FIG. 1—Computer System

FIG. 1 illustrates a computer system 83 operable to create and/or execute a program that includes a GUI element bound to live measurement data. In one embodiment, the GUI element may be bound to a data source, where the data source provides the live measurement data. A method for binding the GUI element to the data source of the live measurement data is described below. According to one embodiment of the method, a user may easily bind the GUI element to the data source of the live measurement data simply by interacting with a graphical user interface, e.g., by interacting with the user interface of an application development environment (ADE) used to create the program. When the program is executed, the GUI element may be operable to automatically receive the live measurement data from the data source and display the live measurement data. The user may not be required to write or add source code to the program to implement this functionality.

In another embodiment, the GUI element may provide live measurement data to a data target. For example, the user may configure the GUI element to receive live measurement data during execution of the program, e.g., by adding source code to the program to cause the GUI element to receive the live measurement data from a measurement device or other source. The user may also bind the GUI element to the data target. When the program is executed, the live measurement data received by the GUI element may automatically be sent to the data target. The user may not be required to write or add source code to the program to implement this functionality. For example, the user may easily bind the GUI element to the data target simply by interacting with a graphical user interface, e.g., by interacting with the user interface of an application development environment (ADE) used to create the program. One embodiment of a method for binding a GUI element to a data target for live measurement data is described below.

Referring again to FIG. 1, the computer system 83 may include a display device. The computer system 83 may also include a memory medium(s) on which one or more computer programs or software components may be stored. In one embodiment the memory medium may store an application development environment (ADE) used to create a program that includes a GUI element bound to a data source or data target of live measurement data. The ADE may allow the user to easily bind the GUI element to the data source or data target of live measurement data, as described above. For example, the user may interact with a user interface of the ADE displayed on the display device to bind the GUI element to the data source or data target of live measurement data. In one embodiment, the memory medium may also store one or more components or controls utilized to implement the live measurement data binding, such as the data source component or data target component described below.

In one embodiment, the memory medium of the computer system 83 may store a program that includes a GUI element bound to a data source or data target of live measurement data, as described above. For example, the computer system 83 may execute the program, and a graphical user interface of the program may be displayed on the display device. Displaying the graphical user interface of the program may include displaying the GUI element, where the GUI element displays live measurement data. Exemplary GUI elements for displaying live measurement data are described below.

In another embodiment, the program may be created on the computer system 83 and may then be deployed on another computer system for execution, or the program may be created on another computer system and then deployed on the computer system 83.

Figure 2:
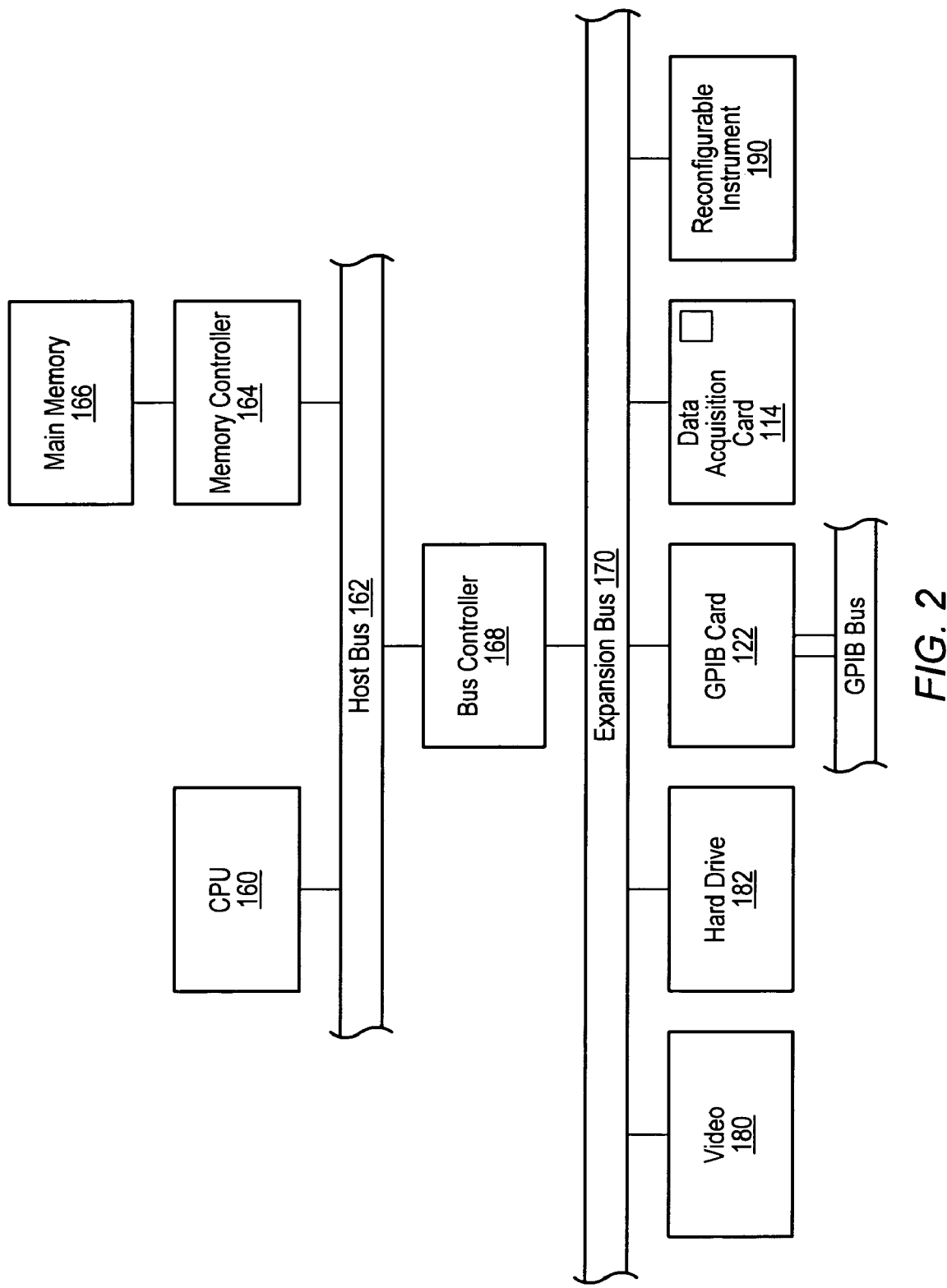
FIG. 2 is a block diagram representing one embodiment of the computer system illustrated in FIG. 1.

FIG. 2—Computer System Block Diagram

FIG. 2 is a block diagram representing one embodiment of the computer system 83 illustrated in FIG. 1. It is noted that any type of computer system configuration or architecture can be used as desired, and FIG. 2 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a PENTIUM class, a POWERPC processor, a CPU from the SPARC family of RISC processors, as well as others. A memory medium, typically comprising RAM and referred to as main memory, 166 is coupled to the host bus 162 by means of memory controller 164. The main memory 166 may store programs such as described above with reference to FIG. 1. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 may include slots for various devices. The computer 83 further comprises a video display subsystem 180 and hard drive 182 coupled to the expansion bus 170.

In one embodiment a device 190 may also be coupled to the computer 83. The device 190 may include a processor and memory which may execute a real time operating system. The device 190 may also or may instead comprise a programmable hardware element. In one embodiment, at least a portion of the program that includes the GUI element bound to a data source or data target of live measurement data may be deployed for execution on the device 190.

Although not shown in FIG. 2, a network interface card or other network device may also be coupled to the computer 83. In one embodiment a program executing on the computer 83 that includes a GUI element bound to a data source may receive live measurement data from a remote computer with which the data source is associated, via the network interface card or other network device. Similarly, a program that includes a GUI element bound to a data target may send live measurement data from the computer 83 to a remote computer with which the data target is associated, via the network interface card or other network device.

Exemplary Systems

Figure 3A:
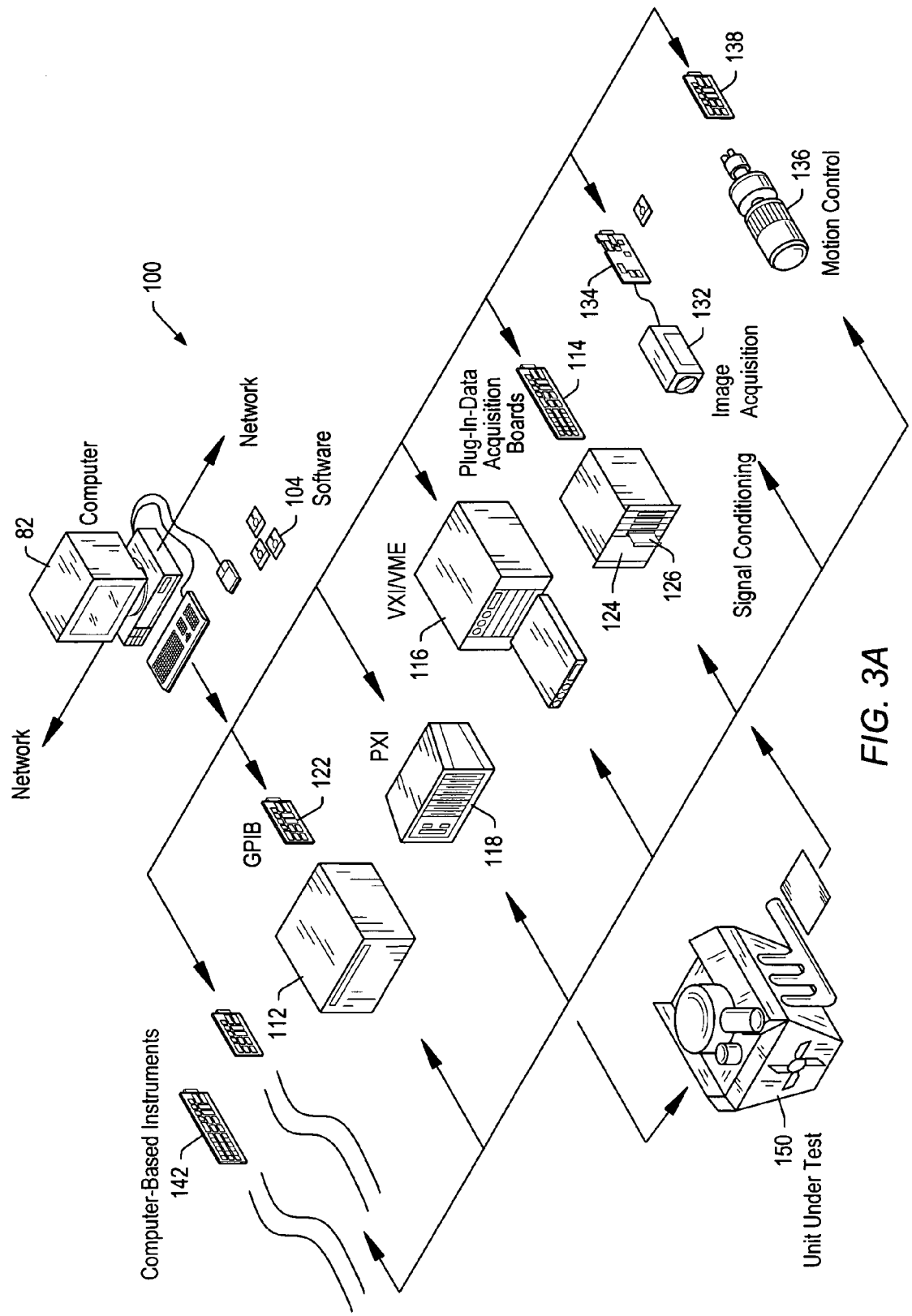
FIGS. 3A and 3B illustrate an exemplary computer coupled to one or more devices or instruments operable to generate live measurement data.
Figure 3B:
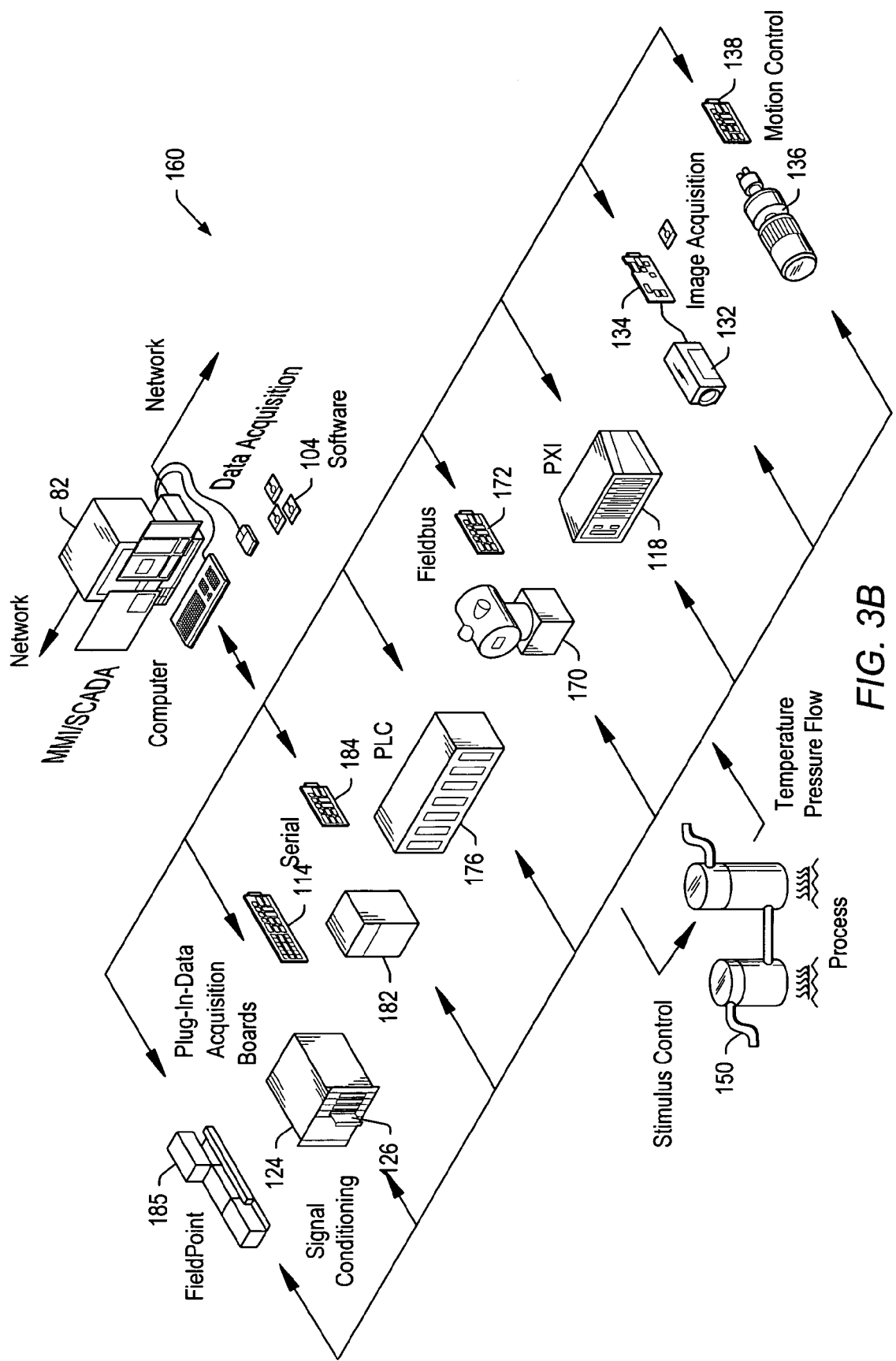

As noted above, in one embodiment a program executing on the computer 83 that includes a GUI element bound to a data source may receive live measurement data from a remote computer with which the data source is associated. FIGS. 3A and 3B illustrate an exemplary computer 82 coupled to one or more devices or instruments operable to generate live measurement data. Thus, in one embodiment the GUI element may receive the live measurement data generated by the one or more devices via the computer 82. For example, the computer 82 may establish a data source or network address to which the GUI element (or the program that includes the GUI element) may connect to receive the live measurement data.

In one embodiment the computer 82 may package or re-format the raw live measurement data received from the one or more devices or instruments, e.g., by packaging or marshaling the data into data packets or formatting the data according to any of various formats suitable for sending via a computer network. In this case, the receiving computer may un-package the live measurement data from the data packets or interpret the live measurement data according to the data format used for sending the live measurement data to the receiving computer.

As described above, in another embodiment, a program executing on the computer 83 may include a GUI element bound to a data target. In this embodiment, the computer 83 may be coupled to one or more devices or instruments operable to generate live measurement data, similarly as shown in FIGS. 3A and 3B for the computer 82. The program executing on the computer 83 may be operable to display live measurement data acquired from the one or more devices or instruments in the GUI element, as well as send the live measurement data to the data target to which the GUI element is bound, e.g., may send the live measurement data via a network to a data target associated with a remote computer.

In various embodiments, the computer 82 shown in FIGS. 3A and 3B (or the computer 83) may acquire live measurement data for test and/or measurement functions; for controlling and/or modeling instrumentation or industrial automation hardware; for modeling and simulation functions, e.g., modeling or simulating a device or product being developed or tested, etc. Exemplary test applications where the computer 82 may be used include hardware-in-the-loop testing and rapid control prototyping, among others.

However, the computer 82 may be used to acquire live measurement data for a plethora of applications, and the above applications are exemplary only. For example, in various embodiments, live measurement data may be acquired in applications involving the control of other types of devices such as multimedia devices, video devices, audio devices, telephony devices, Internet devices, etc. In any of these various applications, a program that includes a GUI element may be bound to a data source to automatically receive the live measurement data as described herein.

FIG. 3A illustrates an exemplary instrumentation control system 100. The system 100 includes a host computer 82 that connects to one or more instruments. The host computer 82 may include a CPU, a display screen, memory, and one or more input devices such as a mouse or keyboard as shown. The computer 82 may communicate with the one or more instruments to analyze, measure, or control a unit under test (UUT) or process 150. As described above, the computer 82 may also communicate with the one or more instruments to acquire live measurement data from the UUT or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, a hardware-in-the-loop validation application, etc.

FIG. 3B illustrates an exemplary industrial automation system 160. The industrial automation system 160 is similar to the instrumentation or test and measurement system 100 shown in FIG. 3A. Elements which are similar or identical to elements in FIG. 3A have the same reference numerals for convenience. The system 160 may include a computer 82 that connects to one or more devices or instruments. The computer 82 may include a CPU, a display screen, memory, and one or more input devices such as a mouse or keyboard as shown.

The computer 82 may communicate with the one or more devices to a process or device 150 to perform an automation function, such as an MMI (Man Machine Interface), SCADA (Supervisory Control and Data Acquisition), portable or distributed data acquisition, process control, advanced analysis, or other control. As described above, the computer 82 may also communicate with the one or more devices to acquire live measurement data from the process or device 150.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the FIELDPOINT system available from National Instruments, among other types of devices.

In the systems of FIGS. 3A and 3B, the illustrated devices and instruments are exemplary only, and not all of the illustrated devices and instruments may be connected to the computer 82. Also, the computer 82 may utilize any of various other kinds of devices or instruments other than those shown to acquire live measurement data. Also, one or more of the various devices may couple to each other or to the computer 82 over a network, such as the Internet.

Figure 4:
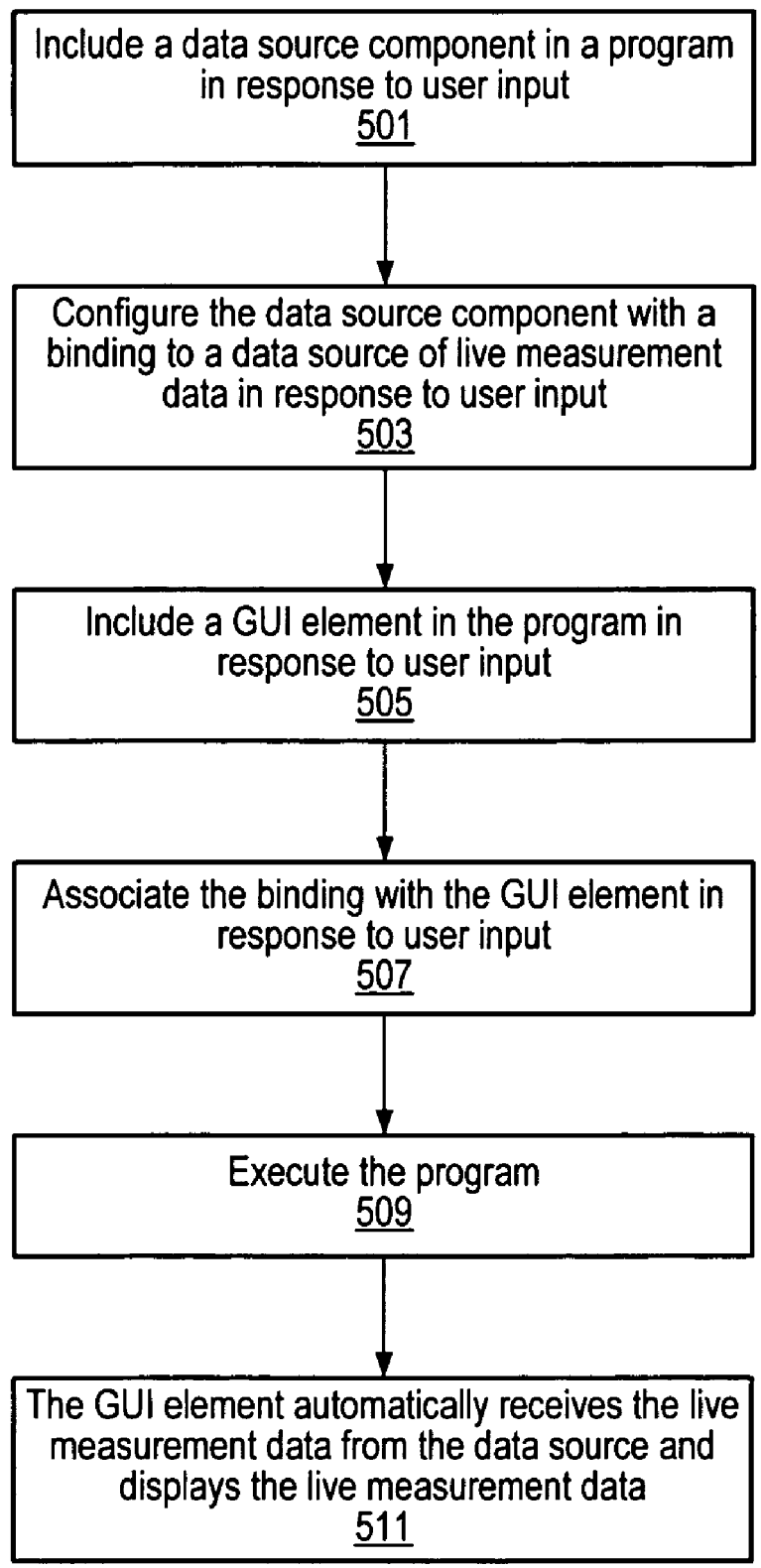
FIG. 4 is a flowchart diagram illustrating one embodiment of a method for binding a GUI element in a program to a data source of live measurement data.

FIG. 4—Binding a GUI Element to a Data Source of Live Measurement Data

FIG. 4 is a flowchart diagram illustrating one embodiment of a method for binding a GUI element in a program to a data source of live measurement data. It is noted that FIG. 4 illustrates a representative embodiment, and alternative embodiments are contemplated. Also, various elements may be combined, omitted, or performed in different orders.

In 501, a data source component may be included in a program in response to user input. For example, the user may interact with the user interface of an application development environment (ADE) to include the data source component in the program. In various embodiments, the user may utilize any ADE to create any kind of program. For example, in one embodiment the user may interact with the user interface of a graphical programming development environment to include the data source component in a graphical program. In another embodiment the user may include the data source component in a text-based program, such as a program written in C, C++, VISUAL C++, VISUAL BASIC, JAVA, etc. For example, the user may utilize the MICROSOFT VISUAL STUDIO ADE or another ADE to create the text-based program.

In one embodiment the data source component may comprise a software component, object, or control having associated program instructions. For example, the data source component may have functionality implemented by the associated program instructions for connecting to a data source, e.g., to receive live measurement data from the data source. As described below, in one embodiment the user may specify the data source from which to receive the live measurement data.

The data source component may be implemented using any of various programming methodologies or technologies. For example, in one embodiment, the data source component may be implemented as a NET control in accordance with Microsoft's .NET programming model. In another embodiment, the data source component may be implemented as a Java component or according to any of various other public or proprietary specifications.

An application development environment (ADE) may provide the data source component for use by the user in creating the program. In one embodiment the data source component may be installed on the user's computer system (e.g., the computer 83 described above) separately from the application development environment. For example, the data source component may be installed separately as part of another application or as a toolkit or add-on package to the application development environment. Installing the data source component on the user's computer system may comprise storing one or more files or storing data on the computer system, where the files or data represent or providing access to the data source component. As one example, where the data source component comprises a .NET control, one or more files representing the .NET control may be installed on the computer system.

In various embodiments, the data source component may be included in the program in response to any kind of user input. Including the data source component in the program may comprise enabling the program to utilize the data source component during execution of the program. In one embodiment, the data source component may be included in the program in response to user input received to a graphical user interface of the ADE used to create the program. For example, the graphical user interface of the ADE may enable the user to select from various pre-existing components to include in the program.

In various embodiments, the graphical user interface of the ADE may provide access to the data source component in various ways, e.g., depending on the particular ADE being used and/or depending on the implementation of the data source component. For example, in one embodiment, the graphical user interface of the ADE may simply provide a file dialog box enabling the user to select a filename of a desired data source component. In another embodiment, the graphical user interface of the ADE may be operable to display a list of available components or controls, e.g., in response to a user request to select a component. In another embodiment, the graphical user interface of the ADE may represent available components or controls visually, e.g., as an icon or picture. Thus, the data source component may be included in the program in various ways, e.g., by selecting a filename of the data source component, selecting the data source component from a list, dragging and dropping a visual representation of the data source component into a window for the program, etc.

In another embodiment, including the data source component in the program may comprise including one or more lines of source code (or a portion of graphical source code) referencing the data source component in a program file of the program to enable the program to utilize the data source component.

In 502, the data source component may be configured with a binding to a data source of live measurement data in response to user input. In various embodiments, the data source may comprise any kind of source operable to send live measurement data to the data source component. For example, the data source may be associated with a remote computer that acquires the live measurement data from a device or instrument as described above with reference to FIGS. 3A and 3B. In another embodiment, the data source may be associated with a server computer, where the server computer receives the live measurement data from another computer and relays the live measurement data to the computer on which the program including the data source component executes. For example, in one embodiment the data source component may be configured with a binding to a data source of live measurement data associated with a DataSocket server computer, as described below.

In various embodiments, different kinds of information may specify or identify the data source of live measurement data. For example, in one embodiment the user may specify a network address identifying the data source of live measurement data. In one embodiment, the data source of live measurement data may be referenced by a uniform resource locator (URL). As one example, where the data source is associated with a DataSocket server, the URL may reference the data source on the DataSocket server computer.

In various embodiments, the user may provide any kind of user input to configure the data source component with the binding to the data source of live measurement data. In one embodiment the user may provide user input to configure one or more properties associated with the data source component to specify the data source. For example, in one embodiment a property panel for configuring the data source component may be displayed, and user input specifying the data source may be received to the property panel. For example, the property panel may include one or more separate windows or dialog boxes, or user interface elements for setting the properties may be displayed in a portion of another window, e.g., a window of the ADE used to create the program. In another embodiment the user may invoke a dialog for configuring the data source component with the binding to the data source of live measurement data.

In another embodiment, configuring the data source component with the binding to the data source of live measurement data may comprise including one or more lines of source code (or a portion of graphical source code) specifying the binding in a program file of the program. The amount of source code required to configure the data source component with the binding to the data source of live measurement data may be very small (e.g., one or two lines) so that configuring the binding is very simple for the user.

In 505, a GUI element may be included in the program in response to user input. The GUI element may comprise any kind of user interface element or indicator operable to display the live measurement data. As one example, the GUI element may comprise a graph element in which the live measurement data can be graphed. For example, as the live measurement data is received from the data source, the live measurement data may be graphed in the GUI element. The graph may scroll over time or may refresh as new live measurement data is received. In one embodiment the graph may appear to the user as a continuously scrolling graph, e.g., similar to the manner in which live measurement data is displayed on a traditional oscilloscope.

In other embodiments the GUI element may take on other forms, and the live measurement data may be indicated in different ways. For example, in one embodiment the GUI element may simply comprise an indicator operable to display a single data value, e.g., a single floating point number or other data value. Thus, as new data values are received, the GUI element may be updated to display the new data values. Other examples of GUI elements for displaying the live measurement data include: a knob or dial GUI element that turns to indicate the data values received, a tank GUI element that visually indicates a fluctuating liquid level based on the data values received, etc.

The GUI element may be included in the program in various ways. Including the GUI element in the program may comprise enabling the program to utilize or display the GUI element during execution of the program. In one embodiment the ADE used to create the program may provide the user with access to the GUI element. For example, the user may interact with a graphical user interface of the ADE to include the GUI element in the program, e.g., by dragging the GUI element from a palette and dropping it into a graphical user interface of the program, or by selecting the GUI element using a menu command or other input.

In one embodiment the GUI element may comprise a WINDOWS FORMS control, i.e., a control that conforms to the Windows Forms specifications. For example, the Windows Forms control may be included in a program constructed according to Microsoft's .NET programming model. According to one embodiment, the user may be able to easily bind any Windows Forms control to a data source of live measurement data according to the method described herein. For example, one embodiment of the method may enable a user to bind a Windows Forms control to a data source of live measurement data similarly to the way in which Windows Forms controls can be bound to data sources of static data. In one particular embodiment, a Windows Forms control may be bound to a data source associated with a DataSocket server, as described below.

Figure 5:
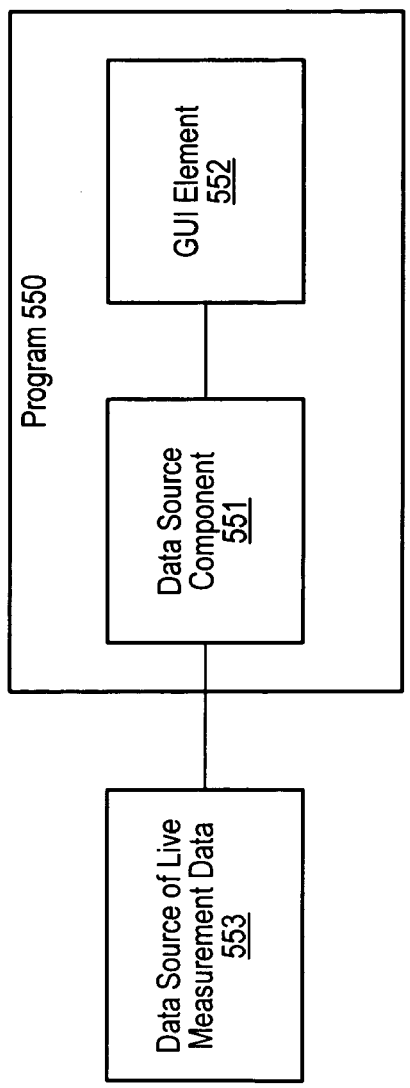
FIG. 5 illustrates a relationship among a data source component, a GUI element, and a data source of live measurement data, according to one embodiment.

In 507, the binding configured for the data source component in 502 may be associated with the GUI element in response to user input. Associating the binding with the GUI element may effectively bind the GUI element to the data source of live measurement data specified in 502. As indicated in 509 and 511, the program may be executed, and the GUI element may automatically receive the live measurement data from the data source and display the live measurement data as described above. In one embodiment the functionality of receiving the live measurement data from the data source and providing the live measurement data to the GUI element may be implemented by the data source component. Thus in one embodiment the data source component may act as an intermediate component between the GUI element and the data source of live measurement data. FIG. 5 illustrates an embodiment in which a data source component 551 and a GUI element 552 have been included in a program 550. As shown, the data source component 551 acts as an intermediate component between the GUI element 552 and a data source of live measurement data 553 in this embodiment. In other embodiments the functionality of receiving the live measurement data and providing the live measurement data to the GUI element may be implemented in any other way desired.

In various embodiments, the user may provide any kind of user input to associate the binding configured for the data source component with the GUI element. In one embodiment the user may specify a name for the binding configured in 502, and 507 may comprise associating the name of the binding with the GUI element. In one embodiment the user may provide user input to configure one or more properties associated with the GUI element to specify or select the binding. For example, in one embodiment a property panel for configuring the GUI element may be displayed, and user input specifying or selecting the binding may be received to the property panel, similarly as described above. In another embodiment the user may invoke a dialog for associating the binding to the data source of live measurement data with the GUI element.

In another embodiment, associating the binding with the GUI element may comprise performing one or more programmatic calls to associate the binding with the GUI element during execution of the program. Thus, the user may include one or more lines of source code (or a portion of graphical source code) in the program to associate the binding with the GUI element. The amount of source code required to associate the binding with the GUI element may be very small (e.g., one or two lines) so that creating the association is very simple for the user.

The method described above may advantageously remove the burden on the user (programmer) from implementing functionality for obtaining live measurement data from a remote data source and displaying the live measurement data in a program. In one embodiment the user may be required to write little or no source code to implement this functionality and may instead simply interact with a graphical user interface of the application development environment used to create the program, e.g., may interact with the graphical user interface of the ADE to configure the data source component with a binding to a data source of live measurement data and to associate the binding with a GUI element.

Although the above description refers to a single GUI element that displays live measurement data during execution of the program, in one embodiment the program may include multiple GUI elements that are each configured to display live measurement data from a data source. For example, each GUI element may display live measurement data from a different data source. In one embodiment a separate data source component for each GUI control may be included in the program, and each data source component may be configured with a binding to a data source of live measurement data for a respective GUI element. In another embodiment, a single data source component may be configured with multiple bindings to different data sources, and each GUI element may simply be associated with the desired binding. For example, in one embodiment the user may specify a URL or other address for each data source of live measurement data and may specify names for bindings to the data sources. The user may then associate the bindings with the GUI elements by specifying the name of the desired binding for each GUI element.

Also, as described below, in one embodiment the program may also or may alternatively include a GUI element that is associated with a binding to a data target. A method for binding a GUI element to a data target of live measurement data is described below.

Figure 6:
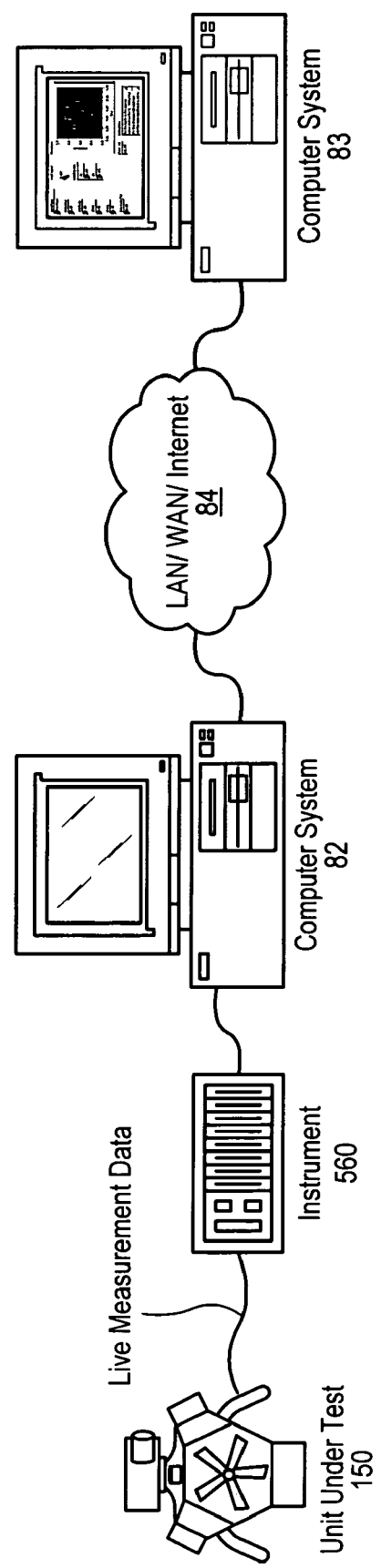
FIG. 6 illustrates one exemplary system in which live measurement data may be automatically received from a data source and displayed in a GUI element of a program, according to one embodiment of the method of FIG. 4.

FIG. 6 illustrates an exemplary system in which live measurement data may be automatically received from a data source and displayed in a GUI element of a program, according to one embodiment of the method of FIG. 4. In this example, a computer system 83 may execute the program that includes the GUI element. The computer system 83 may connect to a computer system 82 via a network 84. The network 84 may comprise any type of network, including a LAN (local area network), WAN (wide area network), the Internet, or an Intranet, among others.

As shown, the computer 82 may acquire live measurement data from an instrument 560. The instrument 560 may comprise a device or instrument such as described above with reference to FIGS. 3A and 3B. For example, the instrument 560 may generate the live measurement data based on a physical phenomenon, e.g., based on a physical measurement of the unit under test (UUT) 150.

In this example, the data source component in the program executing on the computer 83 may be configured with a binding to a data source associated with the computer 82. For example, the data source component may be configured with a binding to a network address associated with the computer 82, where the network address references the data source. The GUI element in the program may be associated with the binding, as described above. Thus, the program may execute on the computer 83 to connect to the data source associated with the computer 82. The computer 82 may be operable to transmit the live measurement data acquired from the instrument 560 to the program in response to the program connecting. The program may cause the live measurement data to be displayed in the GUI element, as described above. For example, the live measurement data may be displayed in the GUI element on a display device of the computer 83.

Figure 7:
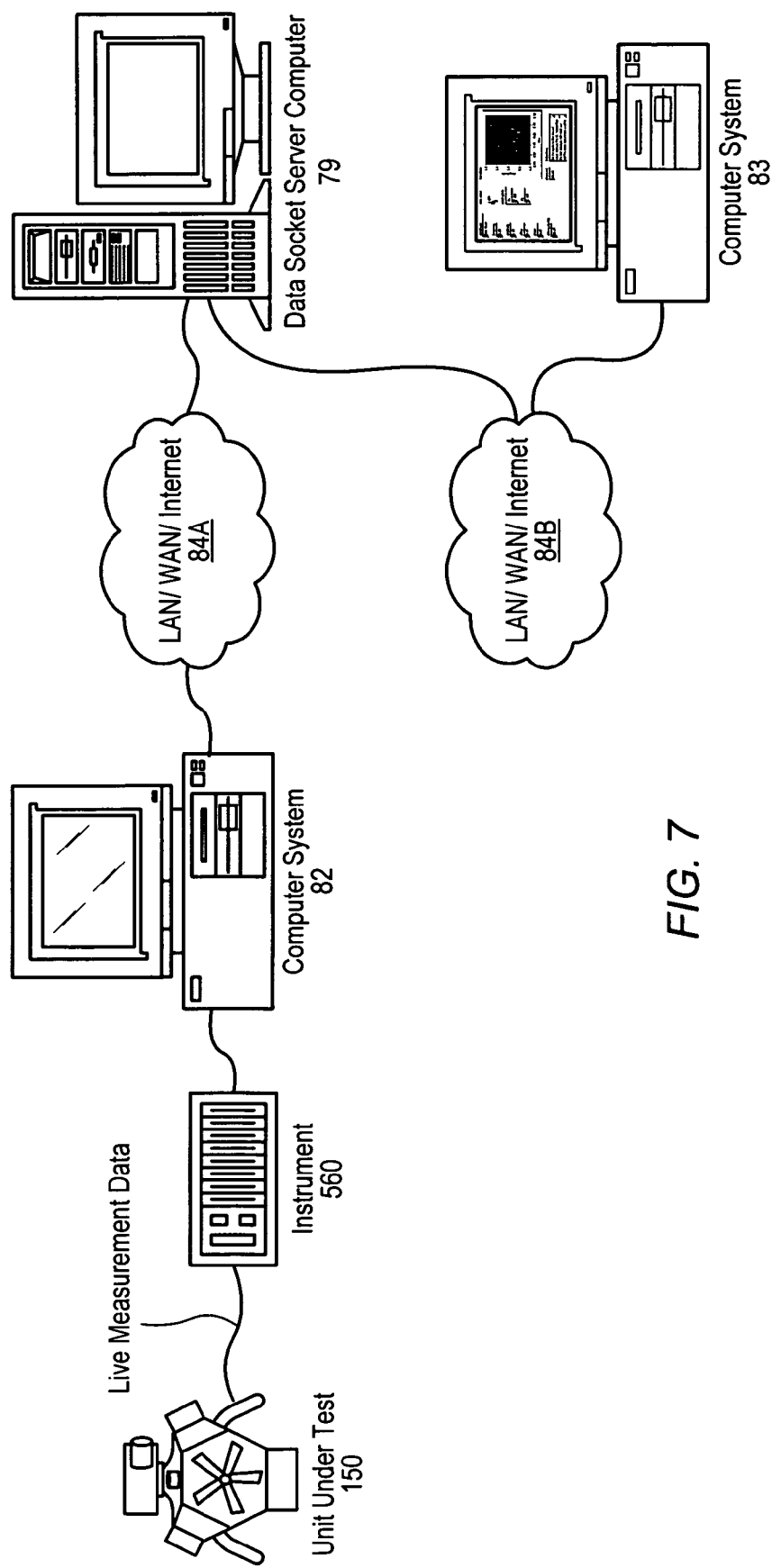
FIG. 7 illustrates another exemplary system in which live measurement data may be automatically received from a data source and displayed in a GUI element of a program, according to another embodiment of the method of FIG. 4.

FIG. 7 illustrates another exemplary system in which live measurement data may be automatically received from a data source and displayed in a GUI element of a program, according to another embodiment of the method of FIG. 4. As noted above, in one embodiment a data source of live measurement data may be associated with a server computer. FIG. 7 illustrates an embodiment in which the data source comprises a data source associated with a DataSocket server computer 79.

In this example, the computer 82 may acquire live measurement data from the instrument 560, similarly as described above, and may send the live measurement data to the DataSocket server computer 79 via the network 84A. The network 84A may comprise any type of network, including a LAN (local area network), WAN (wide area network), the Internet, or an Intranet, among others. The live measurement data may be sent to the DataSocket server computer 79 according to a specialized format for measurement data defined by the DataSocket specification. For example, the computer 82 may execute client-side DataSocket components operable to package the live measurement data into the appropriate format and send the live measurement data to the DataSocket server computer 79.

The DataSocket server computer 79 may establish a data source associated with the live measurement data to which client computers can connect to receive the live measurement data. Thus, in this example the program may execute on the computer 83 to connect to the data source associated with the DataSocket server computer 79 via the network 84B. The network 84B may comprise any type of network, including a LAN (local area network), WAN (wide area network), the Internet, or an Intranet, among others. The DataSocket server computer 79 may transmit the live measurement data received from the computer 82 to the program executing on the computer 83 in response to the program connecting. The program may cause the live measurement data to be displayed in the GUI element, as described above.

It is noted that in another embodiment the DataSocket server may not be located on a separate computer system. For example, in one embodiment the DataSocket server may execute on the computer 82. In another embodiment the DataSocket server may execute on the computer 83.

Figure 8:
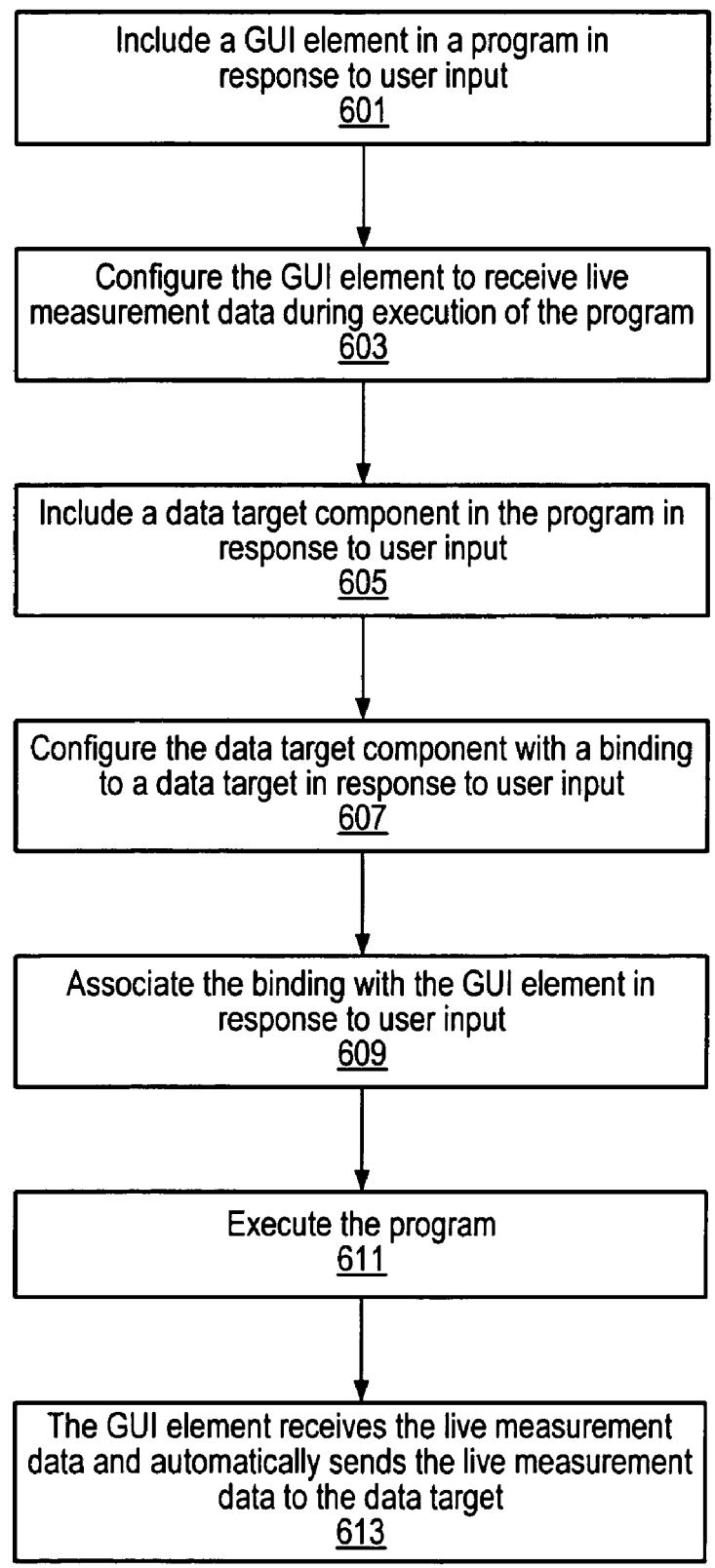
FIG. 8 is a flowchart diagram illustrating one embodiment of a method for binding a GUI element in a program to a data target for live measurement data.

FIG. 8—Binding a GUI Element to a Data Target for Live Measurement Data

FIG. 8 is a flowchart diagram illustrating one embodiment of a method for binding a GUI element in a program to a data target for live measurement data. It is noted that FIG. 8 illustrates a representative embodiment, and alternative embodiments are contemplated. Also, various elements may be combined, omitted, or performed in different orders.

In 601, a GUI element may be included in a program in response to user input, similarly as described above.

In 603, the GUI element may be configured to receive live measurement data during execution of the program. For example, the computer on which the program executes may be coupled to a device or instrument operable to acquire the live measurement data. The GUI element may be configured to receive the live measurement data from the device or instrument. For example, in one embodiment the GUI element may comprise an indicator configured according to conventional programming techniques to display the live measurement data.

In 605, a data target component may be included in the program in response to user input. The data target component may comprise a software component, object, or control similar to the data source component described above. However, rather than being operable to receive live measurement data from a data source, the data target component may be operable to send live measurement data to a data target. For example, the data target component may have associated program instructions that implement functionality to connect to a data target, e.g., via a network, and send live measurement data to the data target.

The data target component may be implemented using any of various programming methodologies or technologies. For example, in one embodiment, the data target component may be implemented as a .NET control in accordance with Microsoft's .NET programming model. In another embodiment, the data target component may be implemented as a Java component or according to any of various other public or proprietary specifications.

In 607, the data target component may be configured with a binding to a data target in response to user input. 607 may be performed similarly as 502 described above with reference to FIG. 4. However, instead of specifying a data source from which to receive live measurement data, the user may specify a data target to which to send live measurement data.

In 609, the binding configured in 607 may be associated with the GUI element in response to user input. 609 may be performed similarly as 507 described above with reference to FIG. 4.

Figure 9:
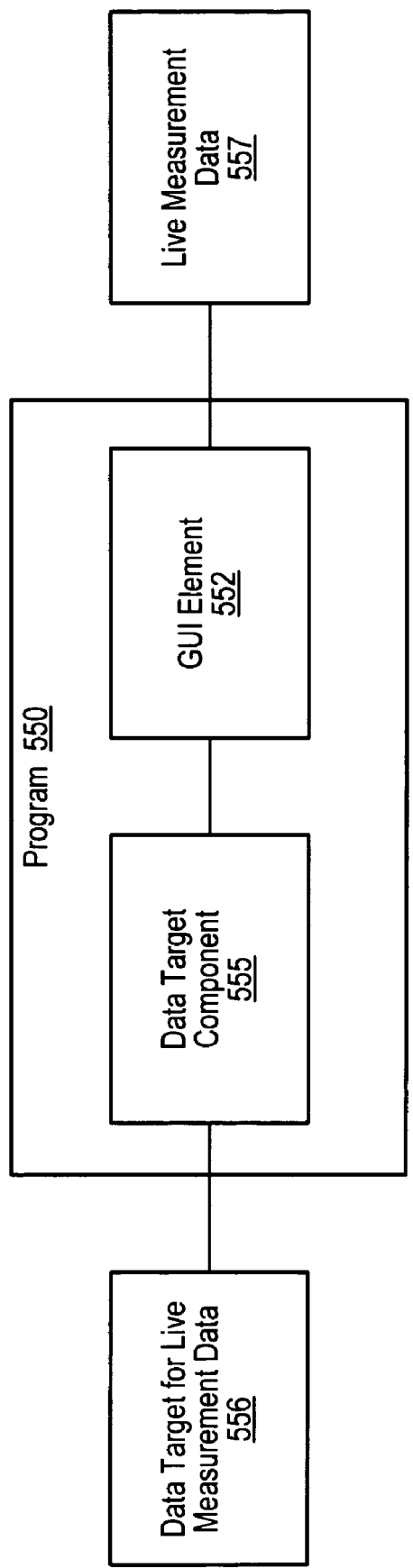
FIG. 9 illustrates a relationship among a data target component, a GUI element, and a data target for live measurement data, according to one embodiment.

In 611, the program may be executed. As indicated in 613, the GUI element may receive the live measurement data as described above with reference to 603, and the live measurement data may be automatically sent to the data target. In one embodiment the functionality of sending the live measurement data to the data target may be implemented by the data target component. Thus in one embodiment the data target component may act as an intermediate component between the GUI element and the data target for the live measurement data. For example, FIG. 9 illustrates an embodiment in which a data target component 555 and a GUI element 552 have been included in a program 550. As shown, the GUI element 552 receives live measurement data 557, and the data target component 555 acts as an intermediate component between the GUI element 552 and a data target 556 for the live measurement data in this embodiment. In other embodiments the functionality of sending the live measurement data to the data target may be implemented in any other way desired.

In various embodiments the data target for the live measurement data may be located on any of various devices or computer systems. In one embodiment the data target may be located on a remote computer, and the program may connect to the remote computer via a network to send the live measurement data to the data target. Also, in one embodiment the data target may be associated with a server computer, and one or more clients may connect to the server computer to obtain the live measurement data sent to the server computer. In one embodiment, the data target may comprise a data target associated with a DataSocket server computer.

The method described above may advantageously remove the burden on the user (programmer) from implementing functionality for sending live measurement data that is displayed in a GUI element to a remote data target. In one embodiment the user may be required to write little or no source code to implement this functionality and may instead simply interact with a graphical user interface of the application development environment used to create the program, e.g., may interact with the graphical user interface of the ADE to configure the data target component with a binding to a data target for the live measurement data and to associate the binding with a GUI element. In one embodiment, the user may already have a program that includes a GUI element operable to receive and display live measurement data. Thus, the user may be able to easily configure the live measurement data to also be sent to a remote data target.

Although the above description refers to sending live measurement data to a single data target during execution of the program, in one embodiment the program may include multiple GUI elements that are each configured to display live measurement data. The user may configure the program to send the live measurement data displayed by each GUI element to a data target.

FIGS. 10-16: Exemplary Implementation

FIGS. 10-16 are screen shots illustrating one exemplary embodiment of the method of FIG. 4 for binding a GUI element in a program to a data source of live measurement data. It is noted that FIGS. 10-16 illustrate one specific embodiment, and numerous alternative embodiments in accordance with the above description are contemplated. In particular, FIGS. 10-16 illustrate an embodiment in which the GUI element comprises a Windows Forms control, and the Windows Forms control is bound to a data source of live measurement data associated with a DataSocket server.

Figure 10:
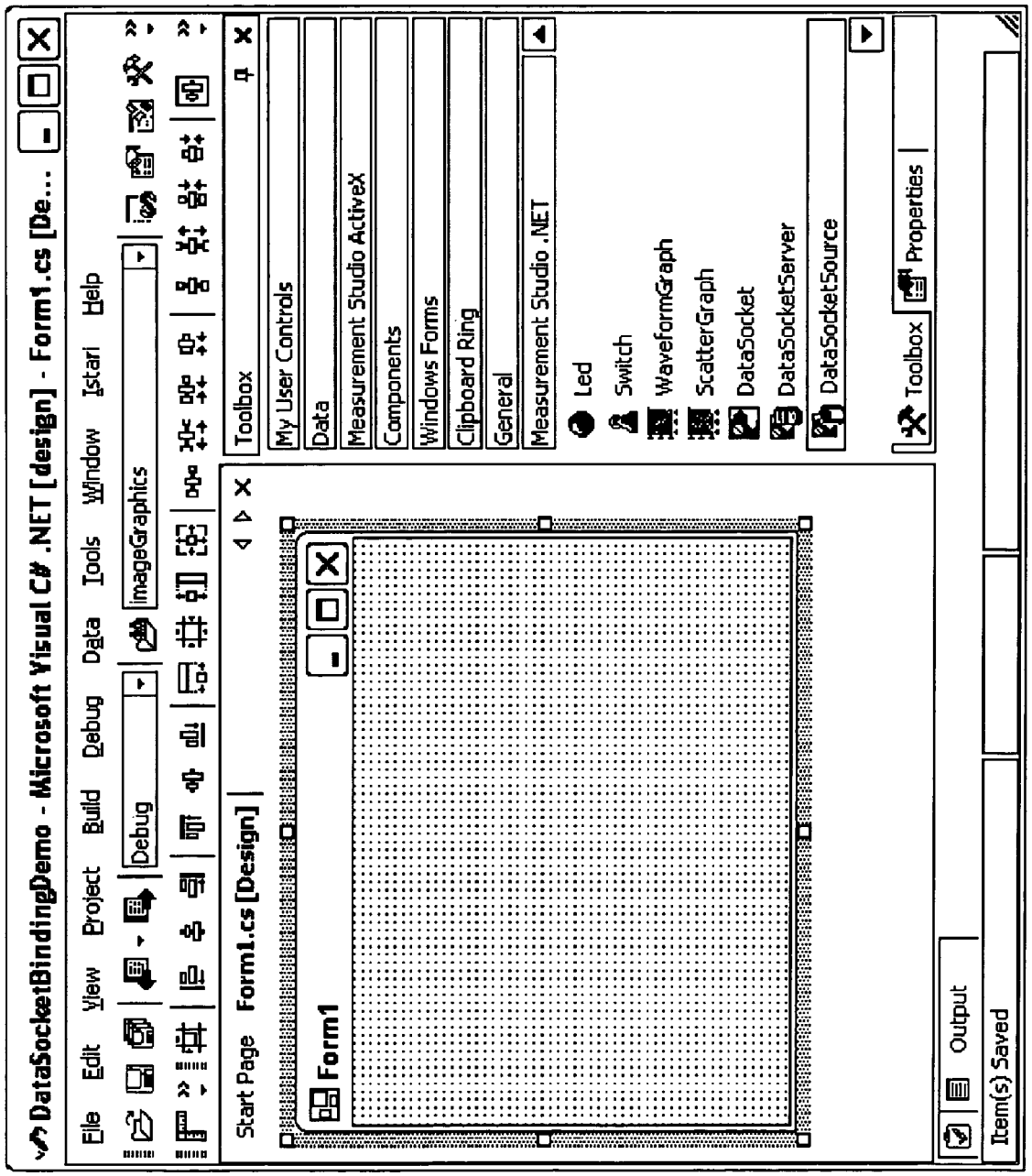
FIGS. 10-16 are screen shots illustrating one exemplary embodiment of the method of FIG. 4.
Figure 11:
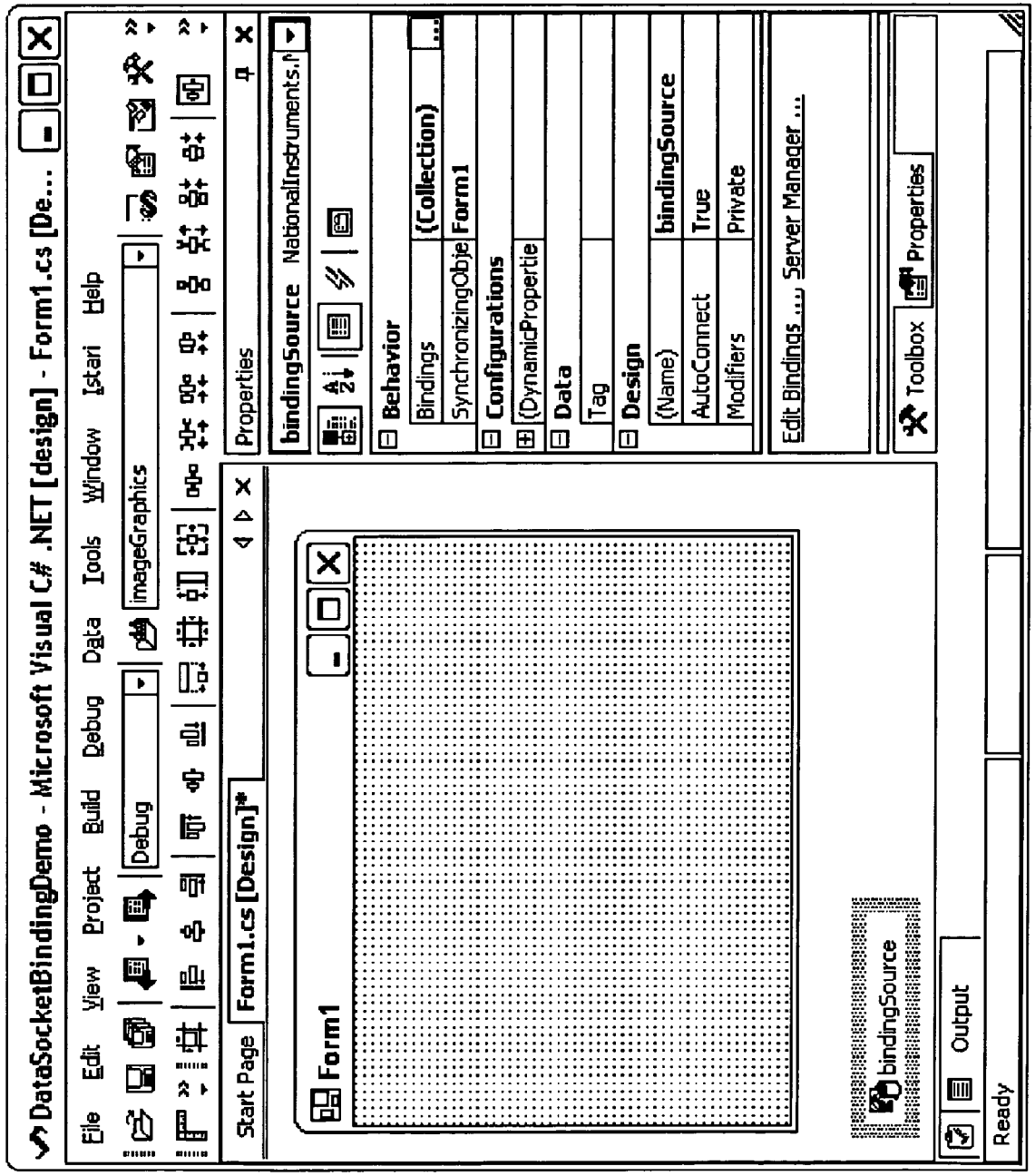

FIG. 10 illustrates a user interface for an application development environment used to create the program. In this example, the Microsoft Visual Studio application development environment is used. As shown, the user has begun to create a program that utilizes a Windows form, "Form 1". The "Measurement Studio .NET" palette in the Toolbox on the right side of the window includes several components, including a DataSocketSource component. The DataSocketSource component is one example of a data source component such as described above with reference to FIG. 4. The user may drop the DataSocketSource component on the form, which puts the DataSocketSource component in the designer component tray. In this example, the user also gives the DataSocketSource component the name, "bindingSource".

The user may then configure the DataSocketSource component with one or more bindings to one or more data sources of live measurement data. For example, the bindings may be specified via the "Bindings" property in the "Properties" panel shown in FIG. 11. The user may click the " . . . " button in the Properties panel to launch a Bindings collection editor. The user may interact with the Bindings collection editor to add one or more bindings, giving each binding a unique name and data source URL. For example, in FIG. 12 the user has configured the DataSocketSource component with two bindings, represented by the names "RPM Sensor" and "RPM SetPoint" in the "Members" box shown on the left side of the window.

Figure 12:
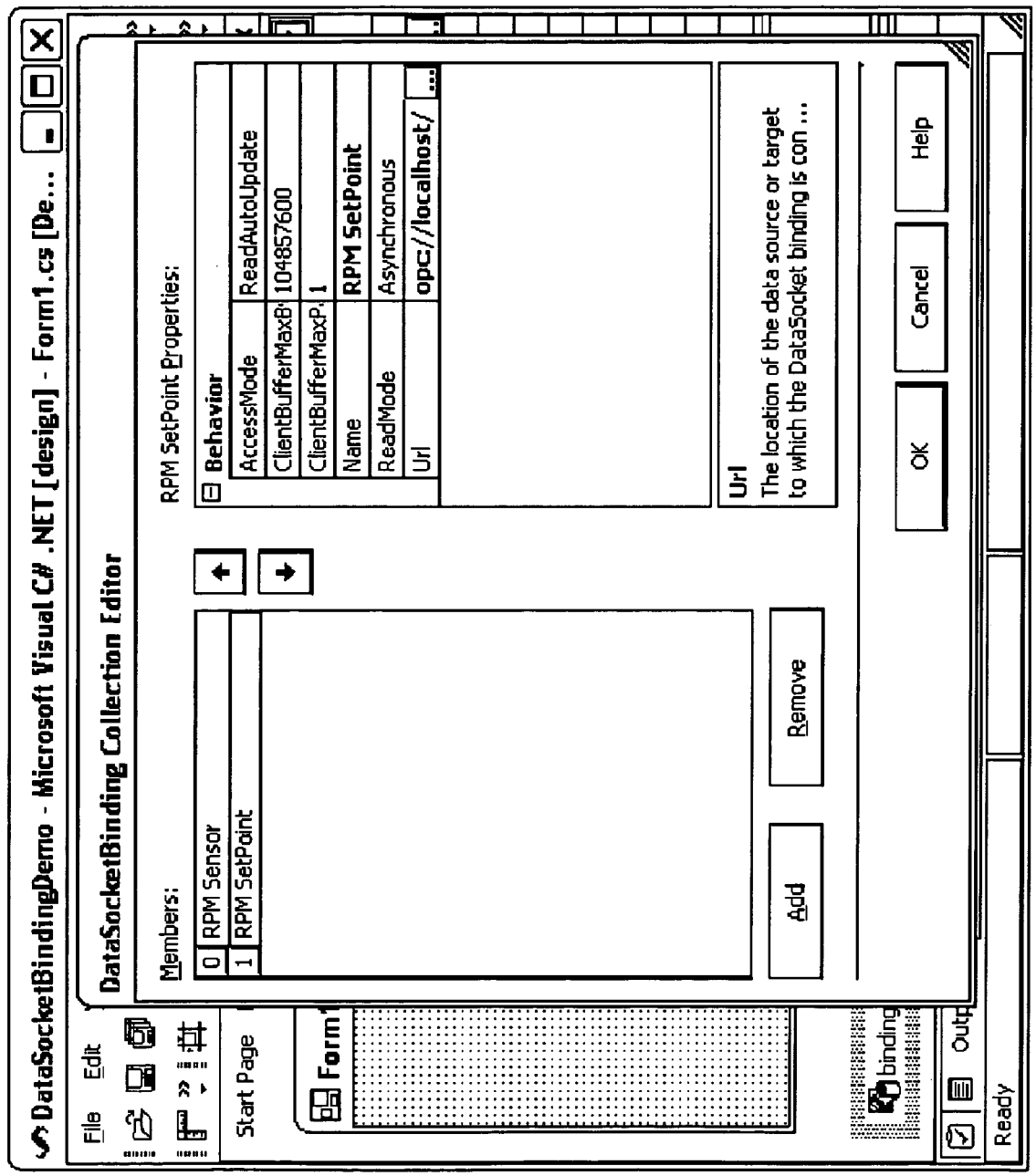

In FIG. 12, the "RPM SetPoint" binding is currently selected. As shown in the "RPM SetPoint Properties" panel on the right side of the window, the URL "opc://localhost/" has been specified as the data source of live measurement data for this binding. Thus, in this example, the "RPM SetPoint" binding comprises a binding to a data source of live measurement data associated with a DataSocket server on the local computer. In other embodiments the user may specify a binding to a data source associated with a DataSocket server on a remote computer. For example, in another embodiment the URL may reference a remote computer system on which the DataSocket server executes, e.g., as described above with reference to FIG. 7.

Figure 13:
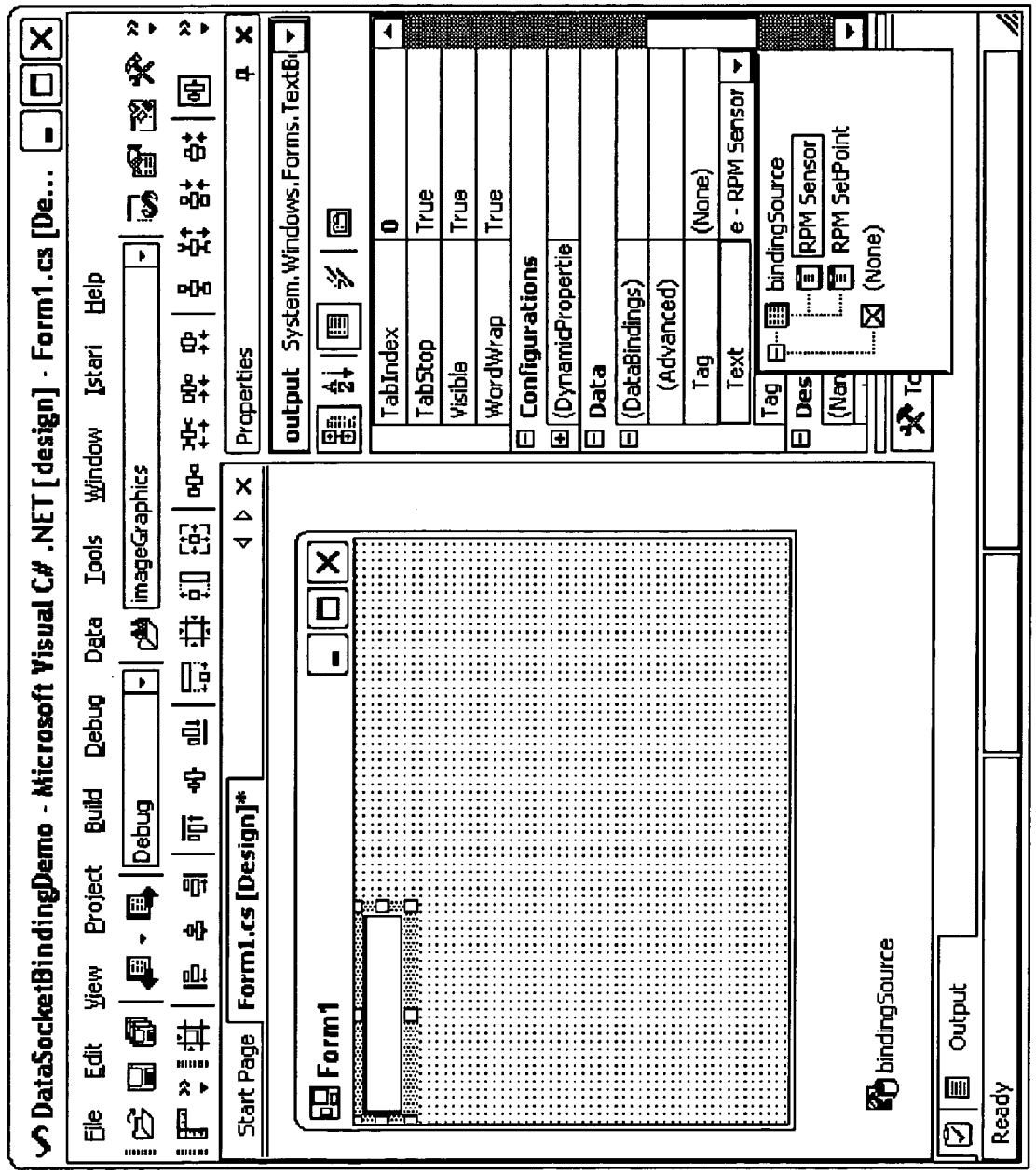

In FIG. 13, the user has dropped a GUI element onto the form, illustrated at the top left of the form. In this example, the GUI element comprises a Windows Forms control, i.e., a control that conforms to the Windows Forms specifications. After dropping the Windows Forms control onto the form, the user may scroll to the "(DataBindings)" item for the control in the Properties panel and select a property of the control to bind to live measurement data. For example, in this case the control includes a "Text" property. The user may activate the drop-down list to cause the illustrated list of bindings to be displayed, and the user may select a binding to associate with the "Text" property.

Figure 14:
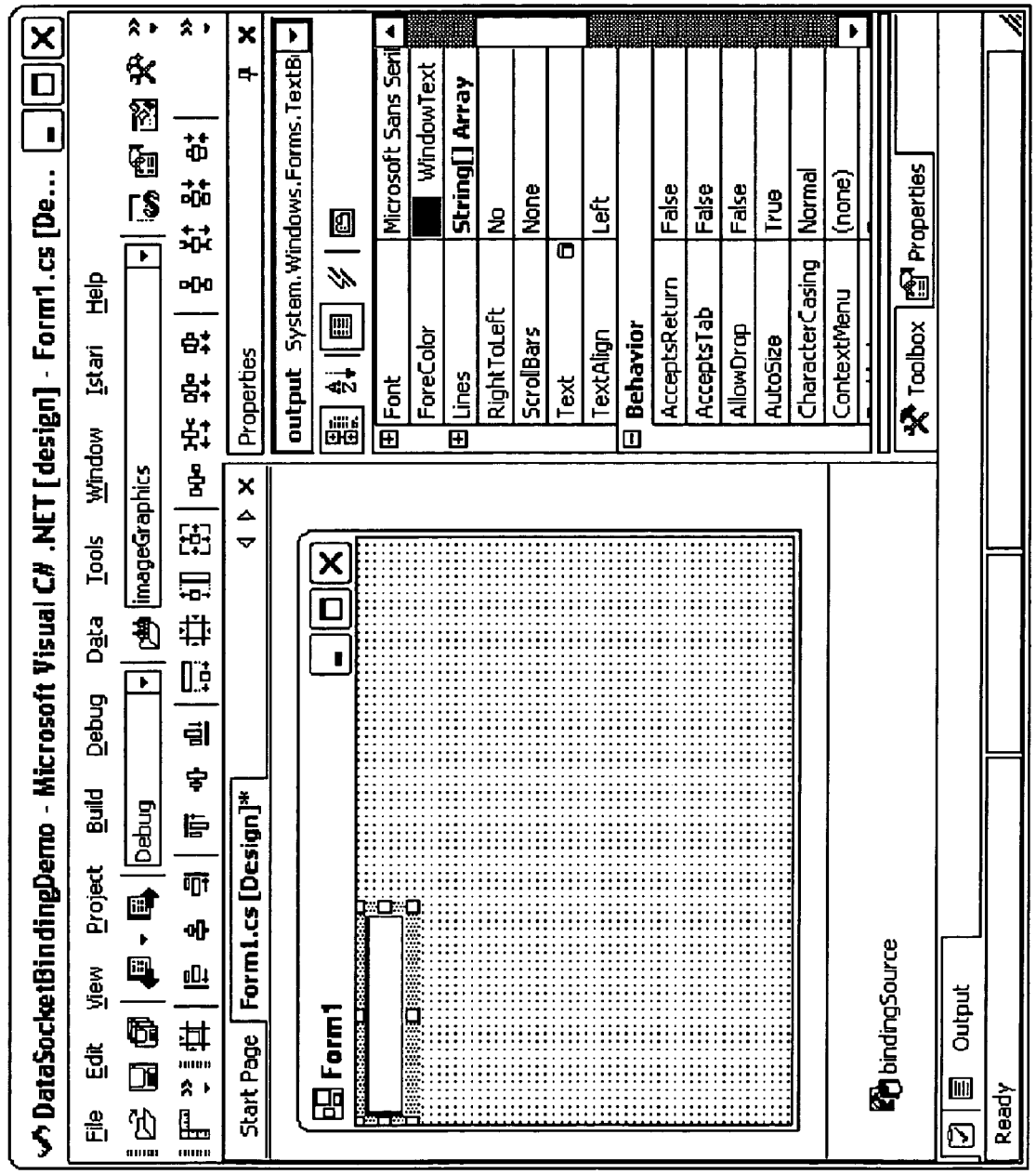

As shown, the list displays the "bindingSource" DataSocketSource component and indicates the bindings configured for the component, i.e., the "RPM Sensor" and "RPM SetPoint" live measurement data bindings described above. The user may select the desired binding from the displayed list to associate the binding with the GUI element (i.e., associate the binding with the "Text" property of the Windows forms control in this example). In this case the user selects the "RPM Sensor" live measurement data binding. As illustrated in FIG. 14, after the user has associated the "RPM Sensor" binding with the "Text" property of the Windows forms control, a glyph appears beside the "Text" property to indicate that it is bound to a data source.

Figure 15:
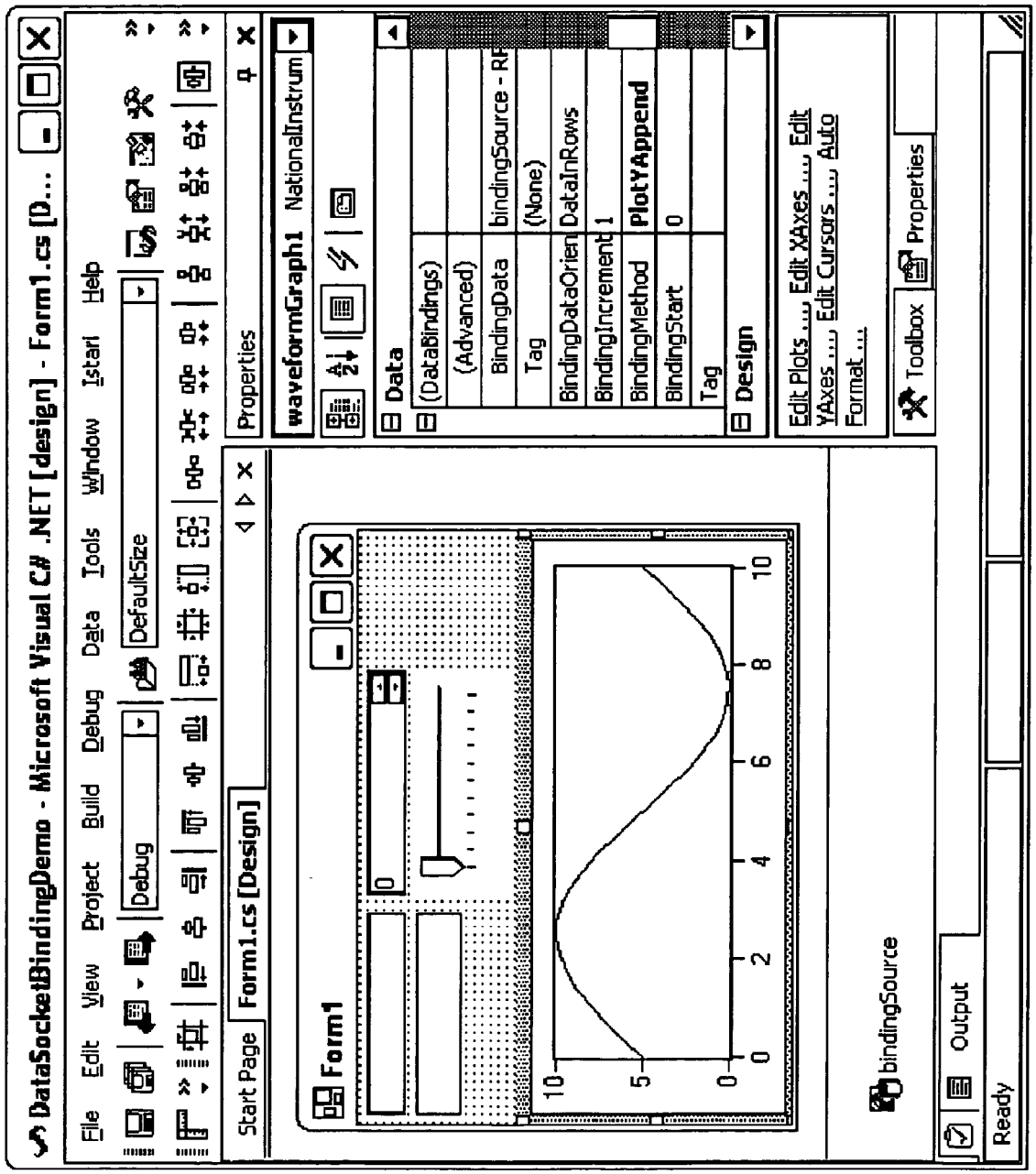

The user may continue to develop the program by including other GUI elements (controls) on the form and possibly associating bindings to live measurement data with the controls, similarly as described above. For example, FIG. 15 illustrates the form after the user has added several different controls, including a graph control. The graph control may also be a Windows forms control and may be bound to a data source of live measurement data similarly as described above.

Figure 16:
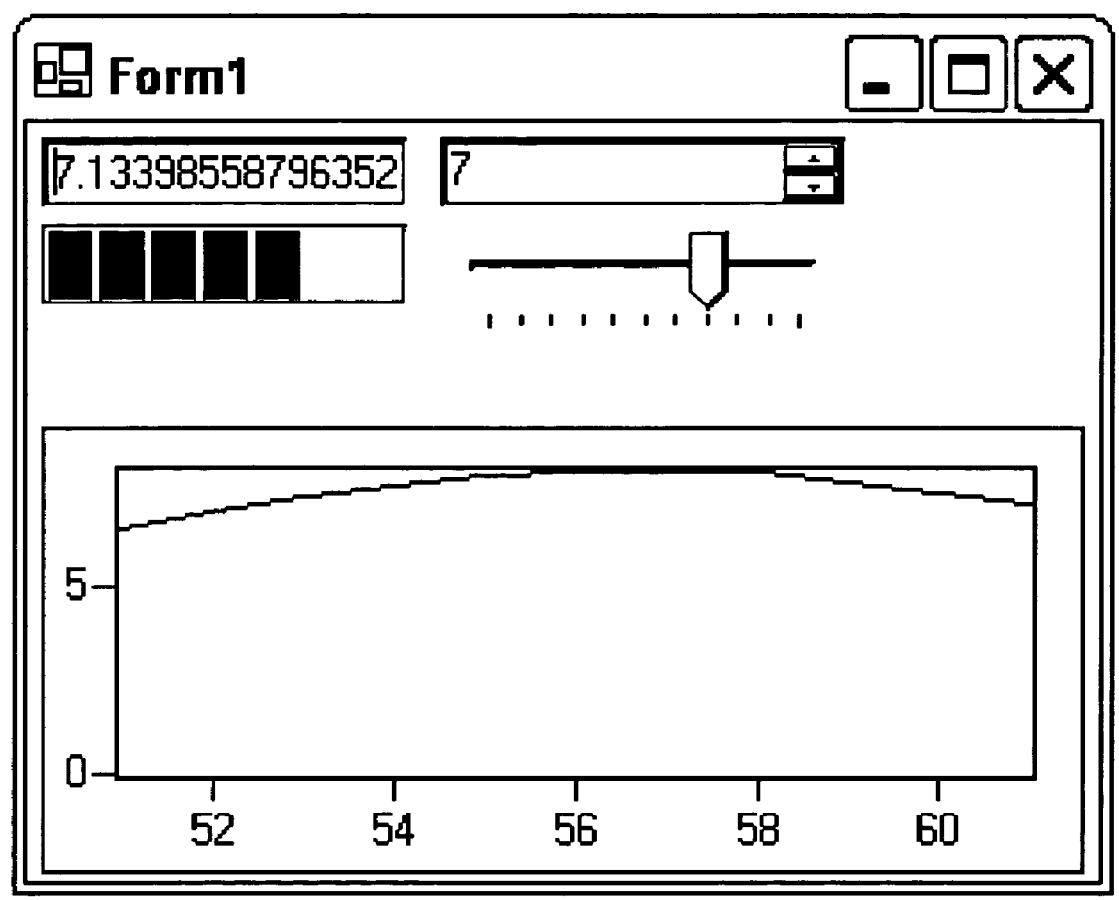

The program may then be executed. The program may execute to connect to the data sources of live measurement data specified by the bindings associated with the Windows Forms controls in the program. For example, the program may connect to the data source(s) of the DataSocket server(s) specified by the binding(s) associated with one or more Windows forms controls in the program. FIG. 16 illustrates an exemplary screen shot of the program's user interface (the form) during execution of the program. In this example, the same "RPM Sensor" binding has been associated with multiple GUI elements (Windows forms controls) in the program. Each GUI element may display live measurement data received via the "RPM Sensor" binding in a manner specific to the GUI element. For example, the GUI element at the top left may display individual data values of the live measurement data, while the graph GUI element may display the live measurement data as a graph. FIG. 16 illustrates the user interface of the program at one point in time. However, in one embodiment, as the user watches the user interface during execution of the program, the GUI elements may appear to be continuously updated as the live measurement data is received from the data source. For example, the graph GUI element may appear to continuously scroll and graph new data values of the live measurement data.

It is noted that in the example described above, the user may run the program after configuring the DataSocketSource component and the GUI elements as described, without having to write source code for the program. Thus, a significant amount of networking functionality may be accomplished automatically, which may enhance the user's ease and efficiency of creating the program. In one embodiment the user may be able to associate any Windows forms control, i.e., any control that conforms to the Windows Forms specifications, with a data source of live measurement data in the manner described above, so that the Windows forms control automatically displays the live measurement data during execution of the program.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory medium storing program instructions executable to:
include a first component in a program in response to user input;
configure the first component with a plurality of concurrent bindings to a plurality of data sources of live measurement data in response to user input, wherein each binding of the plurality of concurrent bindings enables the first component to receive respective live measurement data from a respective data source of the plurality of data sources, wherein the plurality of concurrent bindings includes a first binding to a first data source of first live measurement data;
include a first GUI element in the program in response to user input, wherein the first component is separate from the first GUI element;
display a graphical user interface indicating the plurality of concurrent bindings with which the first component is configured; and
associate the first binding of the plurality of concurrent bindings with the first GUI element in response to user input to the displayed graphical user interface selecting the first binding from the plurality of concurrent bindings;
wherein said associating the first binding with the first GUI element enables the first GUI element to display the first live measurement data from the first data source during execution of the program.

2. The memory medium of claim 1, wherein said associating the first binding with the first GUI element enables the first GUI element to automatically display the first live measurement data from the first data source without requiring a user to add source code to the program to implement said displaying the first live measurement data.

3. The memory medium of claim 1, wherein the first live measurement data comprises measurement data generated by a measurement device.

4. The memory medium of claim 1, wherein the first live measurement data comprises measurement data representing a physical phenomenon.

5. The memory medium of claim 1, wherein the first live measurement data comprises streaming data.

6. The memory medium of claim 1, wherein the first live measurement data is generated by a measurement device that acquires measurement data from a physical system in real time.

7. The memory medium of claim 1, wherein the first GUI element displaying the first live measurement data comprises the first GUI element dynamically graphing the first live measurement data from the first data source.

8. The memory medium of claim 1, wherein said first GUI element displaying the first live measurement data from the first data source comprises the first GUI element continuously receiving and displaying the first live measurement data from the first data source.

9. The memory medium of claim 1, wherein said configuring the first component with the plurality of bindings to the plurality of data sources comprises configuring the first component with a plurality of uniform resource locators (URLs), wherein each URL of the plurality of URLs references a respective data source of the plurality of data sources of live measurement data.

10. The memory medium of claim 1, wherein the first binding to the first data source of first live measurement data comprises a binding to a data source of a DataSocket server;
wherein said associating the first binding with the first GUI element enables the first GUI element to display the first live measurement data received from the DataSocket server.

11. The memory medium of claim 10,
wherein configuring the first component with the first binding to the first data source comprises receiving user input specifying a uniform resource locator (URL), wherein the URL references the data source of the DataSocket server.

12. The memory medium of claim 10,
wherein the first live measurement data originates from a client connected to the DataSocket server.

13. The memory medium of claim 1,
wherein said including the first component in the program in response to user input comprises dragging and dropping the first component into a window associated with the program in response to user input.

14. The memory medium of claim 1,
wherein said configuring the first component with the plurality of bindings to the plurality of data sources of live measurement data comprises receiving user input to a property panel associated with the first component, wherein the user input specifies the plurality of data sources of live measurement data.

15. The memory medium of claim 1,
wherein said including the first GUI element in the program in response to user input comprises dragging and dropping the first GUI element into a window associated with the program in response to user input.

16. The memory medium of claim 1,
wherein said displaying the graphical user interface indicating the plurality of bindings with which the first component is configured comprises displaying the plurality of bindings in a property panel of the first GUI element;
wherein said associating the first binding with the first GUI element comprises receiving user input to the property panel of the first GUI element to select the first binding from the plurality of bindings.

17. The memory medium of claim 1,
wherein the first GUI element comprises a Windows Forms control;
wherein said displaying the graphical user interface indicating the plurality of bindings with which the first component is configured comprises displaying the plurality of bindings in a property panel of the first Windows Forms control;
wherein said associating the first binding with the first GUI element comprises receiving user input to the property panel of the Windows Forms control to select the first binding from the plurality of bindings.

18. The memory medium of claim 1,
wherein the plurality of bindings also includes a second binding to a second data source of second live measurement data;
wherein the program instructions are further executable to:
include a second GUI element in the program in response to user input, wherein the first component is separate from the second GUI element; and
associate the second binding of the plurality of bindings with the second GUI element in response to user input selecting the second binding from the plurality of bindings;
wherein said associating the second binding with the second GUI element enables the second GUI element to display the second live measurement data from the second data source during execution of the program.

19. A memory medium storing program instructions executable to:
include a first component in a program in response to user input;
configure the first component with a plurality of concurrent bindings to a plurality of data sources of live measurement data in response to user input, wherein each binding of the plurality of concurrent bindings enables the first component to receive respective live measurement data from a respective data source of the plurality of data sources, wherein the plurality of concurrent bindings includes a first binding to a DataSocket server;
include a first GUI element in the program in response to user input, wherein the first component is separate from the first GUI element;
display a graphical user interface indicating the plurality of bindings with which the first component is configured; and
associate the first binding of the plurality of bindings with the first GUI element in response to user input to the displayed graphical user interface selecting the first binding from the plurality of concurrent bindings;
wherein said associating the first binding with the first GUI element enables the first GUI element to display data from the DataSocket server during execution of the program.

20. The memory medium of claim 19,
wherein said configuring the first component with the first binding to the DataSocket server comprises configuring the first component with a binding to live measurement data from the DataSocket server;
wherein said displaying the data from the DataSocket server during execution of the program comprises displaying the live measurement data.

21. The memory medium of claim 19,
wherein the plurality of bindings also includes a second binding to the DataSocket server;
wherein the program instructions are further executable to:
include a second GUI element in the program in response to user input, wherein the first component is separate from the second GUI element; and
associate the second binding of the plurality of bindings with the second GUI element in response to user input selecting the second binding from the plurality of bindings;
wherein said associating the second binding with the second GUI element enables the second GUI element to display data from the DataSocket server during execution of the program.

22. A memory medium storing program instructions executable to:
include a first component in a program in response to user input;
configure the first component with a plurality of concurrent bindings to a plurality of data sources of live measurement data in response to user input, wherein each binding of the plurality of concurrent bindings enables the first component to receive respective live measurement data from a respective data source of the plurality of data sources, wherein the plurality of concurrent bindings includes a first binding to a first data source of first live measurement data;
include a Windows Forms control in the program in response to user input, wherein the Windows Forms control is separate from the first component;
display a property panel of the Windows Forms control, wherein the property panel indicates the plurality of concurrent bindings with which the first component is configured; and
associate the first binding of the plurality of concurrent bindings with the Windows Forms control in response to user input to the displayed property panel selecting the first binding from the plurality of concurrent bindings;

wherein said associating the first binding with the Windows Forms control enables the Windows Forms control to display the first live measurement data from the first data source during execution of the program.

23. The memory medium of claim 22, wherein the Windows Forms control is a first Windows Forms control;

wherein the plurality of bindings also includes a second binding to a second data source of second live measurement data;

wherein the program instructions are further executable to:

include a second Windows Forms control in the program in response to user input, wherein the second Windows Forms control is separate from the first component; and display a property panel of the second Windows Forms control, wherein the property panel of the second Windows Forms control indicates the plurality of bindings with which the first component is configured; and associate the second binding of the plurality of bindings with the second Windows Forms control in response to user input to the displayed property panel of the second Windows Forms control selecting the first binding from the plurality of bindings;

wherein said associating the second binding with the second Windows Forms control enables the second Windows Forms control to display the second live measurement data from the second data source during execution of the program.

24. A method comprising:

using one or more computing devices to implement:

including a first component in a program in response to user input;

configuring the first component with a plurality of concurrent bindings to a plurality of data sources of live measurement data in response to user input, wherein each binding of the plurality of concurrent bindings enables the first component to receive respective live measurement data from a respective data source of the plurality of data sources, wherein the plurality of concurrent bindings includes a first binding to a first data source of first live measurement data;

including a first GUI element in the program in response to user input, wherein the first GUI element is separate from the first component;

displaying a graphical user interface indicating the plurality of concurrent bindings with which the first component is configured; and associating the first binding of the plurality of concurrent bindings with the first GUI element in response to user input to the displayed graphical user interface selecting the first binding from the plurality of concurrent bindings;

wherein said associating the first binding with the first GUI element enables the first GUI element to display the first live measurement data from the first data source during execution of the program.

25. The method of claim 24, wherein the plurality of bindings also includes a second binding to a second data source of second live measurement data;

wherein the method further comprises:

including a second GUI element in the program in response to user input, wherein the first component is separate from the second GUI element; and associating the second binding of the plurality of bindings with the second GUI element in response to user input selecting the second binding from the plurality of bindings;

wherein said associating the second binding with the second GUI element enables the second GUI element to display the second live measurement data from the second data source during execution of the program.

26. A system comprising:

one or more processors; and memory storing program instructions;

wherein the program instructions are executable by the one or more processors to implement:

including a first component in a program in response to user input;

configuring the first component with a plurality of concurrent bindings to a plurality of data sources of live measurement data in response to user input, wherein each binding of the plurality of concurrent bindings enables the first component to receive respective live measurement data from a respective data source of the plurality of data sources, wherein the plurality of concurrent bindings includes a first binding to a first data source of first live measurement data;

including a first GUI element in the program in response to user input, wherein the first GUI element is separate from the first component;

displaying a graphical user interface indicating the plurality of concurrent bindings with which the first component is configured; and associating the first binding of the plurality of concurrent bindings with the first GUI element in response to user input to the displayed graphical user interface selecting the first binding from the plurality of concurrent bindings;

wherein said associating the first binding with the first GUI element enables the first GUI element to display the first live measurement data from the first data source during execution of the program.

27. The system of claim 26, wherein the plurality of bindings also includes a second binding to a second data source of second live measurement data;

wherein the program instructions are further executable by the one or more processors to implement:

including a second GUI element in the program in response to user input, wherein the first component is separate from the second GUI element; and associating the second binding of the plurality of bindings with the second GUI element in response to user input selecting the second binding from the plurality of bindings;

wherein said associating the second binding with the second GUI element enables the second GUI element to display the second live measurement data from the second data source during execution of the program.

* * * * *